United States Patent
Dong et al.

(10) Patent No.: US 9,641,279 B2
(45) Date of Patent: May 2, 2017

(54) STOKES-VECTOR-BASED TRANSMISSION AND DETECTION OF OPTICAL POLARIZATION-DIVISION-MULTIPLEXED SIGNALS

(71) Applicant: Alcatel-Lucent USA Inc., Murray Hill, NJ (US)

(72) Inventors: Po Dong, Morganville, NJ (US);
Chongjin Xie, Morganville, NJ (US);
Young-Kai Chen, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 64 days.

(21) Appl. No.: 14/596,912

(22) Filed: Jan. 14, 2015

(65) Prior Publication Data

US 2016/0204894 A1 Jul. 14, 2016

(51) Int. Cl.
*H04B 10/00* (2013.01)
*H04J 14/06* (2006.01)
(Continued)

(52) U.S. Cl.
CPC .......... *H04J 14/06* (2013.01); *H04B 10/5053* (2013.01); *H04B 10/541* (2013.01);
(Continued)

(58) Field of Classification Search
CPC ............................... H04J 14/06; H04B 10/532
See application file for complete search history.

(56) References Cited

U.S. PATENT DOCUMENTS 7,206,469 B2 * 4/2007 Murphy ............... H04B 10/071
340/541
7,218,856 B2 * 5/2007 Takahara ........... H04B 10/2569
398/147
(Continued)

OTHER PUBLICATIONS

Betti, S., et al., "Polarization Modulated Direct Detection Optical Transmission Systems," Journal of Lightwave Technology, vol. 10. No. 12, Dec. 1992, pp. 1985-1997.
(Continued)

*Primary Examiner* — Danny Leung
(74) *Attorney, Agent, or Firm* — Mendelsohn Dunleavy, P.C.; Yuri Gruzdkov (57) ABSTRACT

We disclose an optical transport system configured to transport data using a PDM-modulation format, in which each of two orthogonal polarizations is independently amplitude-modulated, and the relative phase between the carrier waves of the two polarizations may also be modulated. This modulation format enables the optical receiver to perform direct optical detection using a Stokes-vector detector to fully recover the encoded data. In an example embodiment, the corresponding signal processing at the optical receiver may include: determining a Stokes-space rotation matrix corresponding to the polarization-state rotation encountered by the PDM signal in the optical transport link; applying the determined Stokes-space rotation matrix to the Stokes sub-vector measured by the Stokes-vector detector to estimate the Stokes sub-vector of the PDM signal at the originating optical transmitter; converting the estimated Stokes sub-vector into the corresponding Jones vector; and recovering the data by decoding the polarization components of the Jones vector.

14 Claims, 5 Drawing Sheets

(51) Int. Cl.
*H04B 10/50* (2013.01)
*H04B 10/54* (2013.01)
*H04B 10/556* (2013.01)
*H04B 10/67* (2013.01)
*H04B 10/69* (2013.01)

(52) U.S. Cl.
CPC ....... *H04B 10/5561* (2013.01); *H04B 10/671* (2013.01); *H04B 10/69* (2013.01)

(56) References Cited

U.S. PATENT DOCUMENTS

| | | | | |
|---|---|---|---|---|
| 7,809,284 | B2* | 10/2010 | Kaneda | H04B 10/61 |
| | | | | 398/203 |
| 8,121,480 | B2* | 2/2012 | Szafraniec | H04B 10/2569 |
| | | | | 398/205 |
| 8,275,224 | B2* | 9/2012 | Doerr | G02B 6/12014 |
| | | | | 385/1 |
| 8,737,840 | B2* | 5/2014 | Nakamoto | H04B 10/2572 |
| | | | | 398/140 |
| 2005/0046860 | A1* | 3/2005 | Waagaard | G01D 5/345 |
| | | | | 356/478 |

OTHER PUBLICATIONS

Berry, H. G., et al., "Measurement of the Stokes Parameters of Light," Applied Optics, vol. 16, No. 12, Dec. 1977, pp. 3200-3205.
Li, An, et al., "Spectrally Efficient Optical Transmission Based on Stokes Vector Direct Detection," Optics Express, Jun. 2014, vol. 22, No. 13, pp. 15662-15667.

* cited by examiner

STOKES-VECTOR-BASED TRANSMISSION AND DETECTION OF OPTICAL POLARIZATION-DIVISION-MULTIPLEXED SIGNALS

BACKGROUND

Field

The present disclosure relates to optical communication equipment and, more specifically but not exclusively, to transmission and/or detection of optical polarization-division-multiplexed (PDM) signals.

Description of the Related Art

This section introduces aspects that may help facilitate a better understanding of the disclosure. Accordingly, the statements of this section are to be read in this light and are not to be understood as admissions about what is in the prior art or what is not in the prior art.

An optical PDM signal is typically generated at an optical transmitter by separately modulating two optical waves having orthogonal polarizations and combining the resulting two modulated optical waves using a polarization-beam combiner. The resulting combined optical wave is then coupled into an optical fiber for transmission to an optical receiver. Birefringence in the optical fiber, which depends on the environmental factors, such as temperature and mechanical stress, typically causes the polarization state of the optical PDM signal to change along the propagation path. As a result, when the optical PDM signal arrives at the optical receiver, its polarization state is different from what it was at the optical transmitter. To recover the data carried by the received optical PDM signal, the optical transmitter is typically configured to use a combination of coherent (e.g., homodyne or intradyne) detection and polarization rotation. The polarization rotation may be applied by means of a polarization controller in the optical domain or a digital signal processor in the electrical domain.

SUMMARY OF SOME SPECIFIC EMBODIMENTS

Disclosed herein are various embodiments of an optical system configured to transport data using a PDM-modulation format, in which each of two orthogonal polarizations is independently amplitude-modulated, and the relative phase between the carrier waves of the two polarizations may also be modulated. This modulation format enables the optical receiver to perform direct optical detection using a Stokes-vector detector to recover the data encoded in each of the modulated polarizations and/or in the modulated relative phase.

In one possible embodiment, the corresponding signal processing at the optical receiver may include (i) determining a Stokes-space rotation matrix corresponding to the polarization-state rotation encountered by the PDM signal in the optical transport link, (ii) applying the determined Stokes-space rotation matrix to the Stokes sub-vector measured by the Stokes-vector detector to estimate the Stokes sub-vector of the PDM signal at the originating optical transmitter, (iii) converting the estimated Stokes sub-vector into the corresponding Jones vector, and (iv) recovering the data by separately decoding the polarization components of the Jones vector. Various embodiments of the disclosed optical transport system may advantageously provide a relatively inexpensive alternative to conventional optical transport systems configured to employ coherent detection of optical PDM signals.

According to one embodiment, provided is an apparatus comprising an optical detector that includes a polarization splitter configured to split an optical polarization-division-multiplexed (PDM) signal into two light beams and an optical-to-electrical converter configured to generate first, second, and third electrical signals by optically detecting different combinations of light of the two light beams, the first, second, and third electrical signals being measurements of three nontrivial components of a Stokes vector of the optical PDM signal or linearly independent combinations of said three nontrivial components; and a digital signal processor configured to receive the first, second, and third electrical signals from the optical detector and generate therefrom an estimate of first data carried by a first polarization of the optical PDM signal and second data carried by a different second polarization of the optical PDM signal.

According to another embodiment, provided is an apparatus comprising: an optical splitter configured to split an optical beam generated by a laser into a first sub-beam and a second sub-beam; a first optical modulator configured to modulate the first sub-beam with first data using amplitude modulation, without data-carrying phase modulation; a second optical modulator configured to modulate the second sub-beam with second data using phase modulation, wherein the second data are different from the first data; and an optical combiner configured to generate an optical polarization-division-multiplexed (PDM) signal by combining the first sub-beam modulated with the first data and the second sub-beam modulated with the second data in a manner that causes a first polarization of the optical PDM signal to carry the first data and a second polarization of the optical PDM signal to carry the second data.

According to yet another embodiment, provided is an apparatus comprising an O/E converter configured to convert an optical PDM signal into first, second, and third electrical signals. A first polarization of the optical PDM signal is amplitude-modulated with first data. A second polarization of the optical PDM signal is amplitude-modulated with second data different from the first data. A relative phase between the first polarization and the second polarization is modulated with third data different from the first and second data. Each of the first, second, and third electrical signals represents a respective component of a Stokes sub-vector corresponding to a polarization state of the optical PDM signal at the photodetector. The apparatus further comprises a signal processor configured to process the first, second, and third electrical signals to recover the first data, the second data, and the third data.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

For short- and medium-reach optical transport, the use of low-cost and/or low-complexity systems employing direct optical detection may be beneficial. For example, unlike conventional coherent detection of optical PDM signals, direct detection does not normally require polarization diversity or a local oscillator (LO) to be used at the optical receiver. The corresponding digital-signal processing at the optical receiver may therefore be simplified and/or become less costly because there may be no need for LO frequency-offset compensation or phase correction in such an optical receiver. Some embodiments herein are directed at leveraging these and/or other benefits of direct optical detection to provide a relatively inexpensive alternative to conventional coherent optical detection of optical PDM signals.

In fiber optical systems, the polarization state of an optical PDM signal is typically not constant and may vary in response to phase and amplitude changes in either or both of the two constituent orthogonally polarized optical waves. An arbitrary polarization state can generally be represented in either Jones or Stokes space. The following mathematical description briefly explains the relationship between the two representations.

In Jones space, an optical PDM signal can be described using the electric field, E:

$$E = \begin{pmatrix} E_x \\ E_y \end{pmatrix} = \begin{pmatrix} A_x \exp(j\varphi_x) \\ A_y \exp(j\varphi_y) \end{pmatrix} \quad (1)$$

where $E_x$ and $E_y$ are the X and Y components of E (e.g., representing the X- and Y-polarized electric fields, respectively); $A_x$ and $A_y$ are the respective amplitudes of $E_x$ and $E_y$; and $\phi_x$ and $\phi_y$ are the respective phases of $E_x$ and $E_y$. Eq. (1) may also be rewritten as:

$$E = \sqrt{A_x^2 + A_y^2} \exp(j\varphi_x) \begin{pmatrix} \cos\alpha \\ \sin\alpha \exp(j\phi) \end{pmatrix} \quad (2)$$

where:

$$\cos\alpha = A_x/\sqrt{A_x^2 + A_y^2} \quad (3a)$$

$$\sin\alpha = A_y/\sqrt{A_x^2 + A_y^2} \quad (3b)$$

$$\phi = \phi_y - \phi_x \quad (3c)$$

Eq. (4) gives the normalized Jones vector J that can be used to describe the polarization state of E:

$$J = \begin{pmatrix} \cos\alpha \\ \sin\alpha \exp(j\phi) \end{pmatrix} \quad (4)$$

The normalized Jones vector J describes both relative amplitude and phase between the polarization components of E.

In Stokes space, the same optical PDM signal can be described using the Stokes vector, S:

$$S = \begin{pmatrix} s_0 \\ s_1 \\ s_2 \\ s_3 \end{pmatrix} = \begin{pmatrix} E_x E_x^* + E_y E_y^* \\ E_x E_x^* - E_y E_y^* \\ 2\mathrm{Re}(E_x E_y^*) \\ 2\mathrm{Im}(E_x E_y^*) \end{pmatrix} \quad (5)$$

where $S_0$-$S_3$ are the four components of the Stokes vector S. For the normalized Jones vector J, the corresponding Stokes vector, s, is given by Eq. (6) as follows:

$$s = \begin{pmatrix} s_0 \\ s_1 \\ s_2 \\ s_3 \end{pmatrix} = \begin{pmatrix} 1 \\ \cos(2\alpha) \\ \sin(2\alpha)\cos\phi \\ \sin(2\alpha)\sin\phi \end{pmatrix} \quad (6)$$

A point in space having the Cartesian coordinates ($s_1$, $s_2$, $s_3$) can be used to describe the polarization state of E in the form of a point on a unity sphere referred to as the Poincare sphere.

In PDM optical communication systems, a coherent optical detector may be configured to sample the received optical PDM signal in Jones space by measuring field quadratures, $E_{xI}$, $E_{xQ}$, $E_{yI}$, and $E_{yQ}$ where:

$$E_{xI} = A_x \cos(\phi_x) \quad (7a)$$

$$E_{xQ} = A_x \sin(\phi_x) \quad (7b)$$

$$E_{yI} = A_y \cos(\phi_y) \quad (7c)$$

$$E_{yQ} = A_y \sin(\phi_y) \quad (7d)$$

Both phases $\phi_x$ and $\phi_y$ can be measured because the optical LO signal provides a reference phase with respect to which to measure these phases.

Various embodiments disclosed herein are configured to use a Stokes-vector detector instead of a coherent optical detector. As the name implies, a Stokes-vector detector is configured to measure the Stokes vector S or s, e.g., by directly measuring all or a sufficient subset of the vector components $S_0$-$S_3$ (see Eq. (5)) or $s_0$-$s_3$ (see Eq. (6)). In some embodiments, a Stokes-vector detector may be configured to measure a sufficient set of different linear combinations of vector components $S_0$-$S_3$ or $s_0$-$s_3$. An example embodiment of a Stokes-vector detector is described in more detail below in reference to FIG. 4. Additional Stokes-vector detectors are disclosed, e.g., in an article by An Li, Di Che, Vivian Chen, and William Shieh, entitled "Spectrally Efficient Optical Transmission Based on Stokes Vector Direct Detection," published in OPTICS EXPRESS, 30 Jun. 2014, Vol. 22, No. 13, pp. 15662-15667, which is incorporated herein by reference in its entirety.

Figure 1:
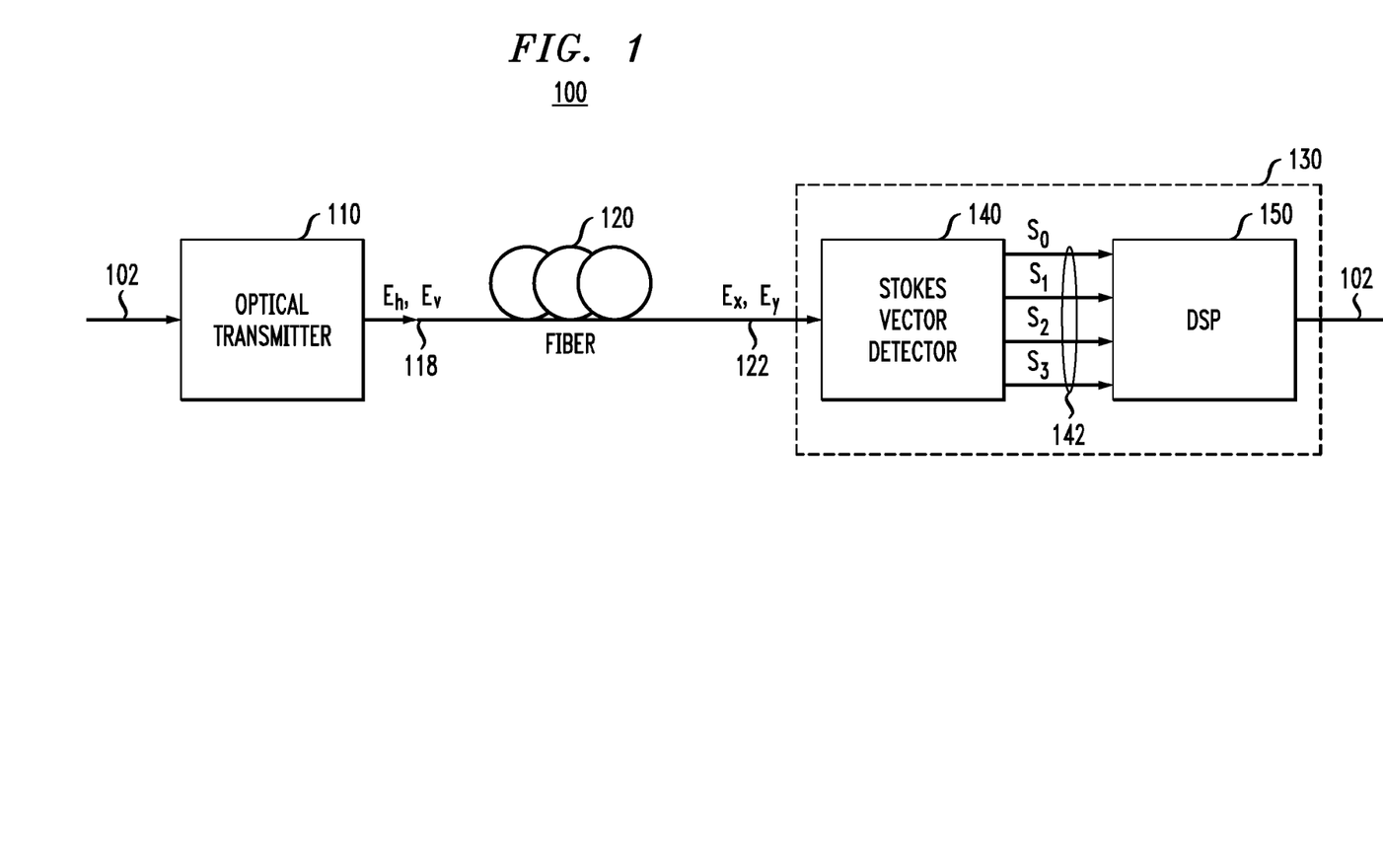
FIG. 1 shows a block diagram of an optical transport system according to an embodiment of the disclosure.

FIG. 1 shows a block diagram of an optical transport system 100 according to an embodiment of the disclosure. System 100 comprises an optical transmitter 110 and an optical receiver 130 all-optically end-connected by an optical fiber channel 120. In an example embodiment, optical fiber channel 120 may include a sequence of one or more spans of optical fiber, wherein adjacent ends of the optical fibers are connected by all-optical processing devices, e.g., including optical amplifiers, optical routers, optical dispersion compensators, etc. (not explicitly shown in FIG. 1). Optical receiver 130 comprises a Stokes-vector detector 140 and a digital signal processor (DSP) 150.

In operation, optical transmitter 110 generates an optical PDM signal 118 having two independently modulated, orthogonally polarized components, $E_h$ and $E_v$. Here, the subscripts h and v illustratively denote the horizontal and vertical polarizations, respectively. In an example embodiment, one of the polarization components, e.g., $E_h$, may be amplitude-modulated but not phase-modulated. The other polarization component, e.g., $E_v$, may be amplitude-modulated, or phase-modulated, or both amplitude-modulated and phase-modulated.

Optical transmitter 110 is configured to modulate input data stream(s) 102 onto the two polarization components of an optical carrier. Example constellations that can be used for amplitude-modulating the first polarization component, e.g., the horizontal polarization of the optical carrier, include but are not limited to N-PAM (Pulse-Amplitude Modulation), where N is a positive integer greater than one. Example constellations that can be used for amplitude- and/or phase modulating the second polarization component, e.g., the vertical polarization of the optical carrier, include but are not limited to M-PAM, BPSK (Binary Phase-Shift Keying), QPSK (Quadrature Phase Shift Keying), and M-QAM (Quadrature Amplitude Modulation), where M is a positive integer greater than one. In various embodiments, the numbers N and M may be the same or different.

In another example embodiment, both polarization components are amplitude-modulated, e.g., to carry respective digital data streams, and the relative phase between the two orthogonally polarized carrier waves is also modulated, e.g., to carry another digital data stream. The latter type of phase modulation can be accomplished, e.g., by phase-modulating orthogonal polarization components of the single optical carrier in a correlated manner to cause the relative phase (rather than independent phases on separate polarization components) to be modulated in accordance with an operative constellation. In some embodiments, three different constellations may be used for amplitude-modulating the first polarization component of the optical carrier, amplitude-modulating the second polarization component of the optical carrier, and modulating the relative phase between the two polarization components, respectively. An example set of such three constellations may include N-PAM, M-PAM, and BPSK. Another example set of such three constellations may include N-PAM, M-PAM, and QPSK. Yet another example set of such three constellations may include N-PAM, M-PAM, and K-PSK, where K is a positive integer greater than four that designates the order of the PSK modulation. In various embodiments, the numbers N and M may be the same or different.

In an example embodiment, Stokes-vector detector 140 may be operated to effectively measure all components of Stokes vector S (see Eq. (5)) or four linearly independent combinations of components of Stokes vector S corresponding to a received optical PDM signal 122. The measured values of $S_0$-$S_3$ or four linearly independent combinations thereof are provided to DSP 150 on electrical bus 142 for further processing therein.

In another example embodiment, Stokes-vector detector 140 may be configured to measure a Stokes sub-vector R corresponding to a received optical PDM signal 122. This Stokes sub-vector is given by Eq. (8) as follows:

$$R = \begin{pmatrix} S_1 \\ S_2 \\ S_3 \end{pmatrix} \quad (8)$$

where $S_1$-$S_3$ are the Stokes-vector components defined in Eq. (5)), e.g., three non-trivial components of the full Stokes vector S. It is evident from the comparison of Eqs. (5) and (8) that the Stokes sub-vector R is a sub-vector of the full Stokes vector S. In this particular embodiment, Stokes-vector detector 140 may not generate an output for the $S_0$ line of electrical bus 142, and this line may be absent in the circuit structure.

Figure 2:
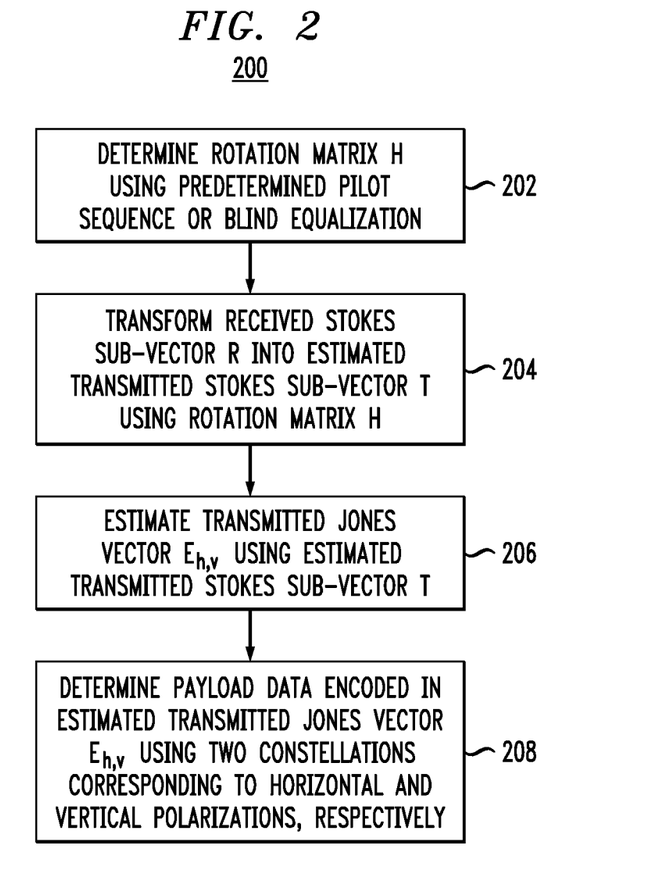
FIG. 2 shows a flowchart of a signal-processing method that can be used in the optical transport system of FIG. 1 according to an embodiment of the disclosure.

DSP 150 operates to digitally process the full Stokes vector S or the Stokes sub-vector R, e.g., to recover estimates of the Jones vector $E_{h,v}$ given by Eq. (9):

$$E_{h,v} = \begin{pmatrix} E_h \\ E_v \end{pmatrix} = \begin{pmatrix} A \\ A_v \exp(j\phi) \end{pmatrix} \quad (9)$$

where $E_h$ and $E_v$ are the horizontal and vertical components of the Jones vector $E_{h,v}$ corresponding to optical PDM signal 118; $A_h$ and $A_v$ are the respective amplitudes of $E_h$ and $E_v$; and $\phi$ is the relative phase between $E_h$ and $E_v$. An example processing method that can be used in DSP 150 for recovering the Jones vector $E_{h,v}$ (Eq. (9)) from the Stokes sub-vector R (Eq. (8)) is described in more detail below in reference to FIG. 2. One of ordinary skill in the art will understand that this method can be modified in a relatively straightforward manner for recovering the Jones vector $E_{h,v}$ (Eq. (9)) from the full Stokes vector S (Eq. (8)).

DSP 150 may further operate to recover an estimate to digital data stream(s) 102 from the sequence of recovered Jones vectors $E_{h,v}$. This is possible because the Jones vector $E_{h,v}$ (Eq. (9)) conforms to the above-explained modulation formats used in the generation of optical PDM signal 118. Hence, DSP 150 can recover an estimate of digital data stream(s) 102, e.g., by (i) mapping the recovered values of $E_h$ and $E_v$ onto the corresponding constellations to determine the constellation symbols and (ii) decoding the determined constellation symbols to recover an estimate of the input digital data streams. DSP 150 then outputs the recovered estimated data stream(s) 102 to external circuits, e.g., as indicated in FIG. 1.

FIG. 2 shows a flowchart of one example of a signal-processing method 200 that can be used in DSP 150 (FIG. 1) according to an embodiment of the disclosure. The signal processing of method 200 is generally directed at recovering data stream 102 by repeating a sequence of steps that may include: (i) determining, from the Stokes sub-vector R measured in the receiver's (X,Y) coordinate-axis system, a corresponding Stokes sub-vector T defined in the transmitter's (h,v) coordinate-axis system; (ii) converting the determined Stokes sub-vector T into a corresponding Jones vector $E_{h,v}$; and (iii) recovering the data encoded in the components $E_h$ and $E_v$ of the Jones vectors $E_{h,v}$. This illustrative sequence of steps may be repeated one or more times, as appropriate or necessary. The following description provides a more detailed explanation of this signal processing according to an example embodiment of method 200.

At step 202 of method 200, DSP 150 determines a rotation matrix H. In an example embodiment, the rotation matrix H is a 3×3 matrix configured to operate on Stokes sub-vectors.

In system 100, the polarization state of an optical PDM signal may be altered, e.g., due to (i) polarization distortions in the optical front end of transmitter 110, (ii) birefringence in optical fiber channel 120, (iii) misalignment of the (h,v) and (X,Y) coordinate-axis systems with respect to one another in optical transmitter 110 and Stokes vector detector 140; and (iv) polarization distortions in the optical front end of receiver 130. The change in the polarization state can be approximated as a polarization-state rotation in Stokes space. The rotation matrix H provides an approximate mathematical representation of this polarization-state rotation.

The rotation matrix H may change over time, e.g., due to the changing environmental factors, such as the temperature of and mechanical stress in optical fiber(s) of optical fiber channel 120. For this reason, the rotation matrix H may need to be estimated on a recurring basis in optical receiver 130, e.g., using a suitable schedule.

In one example embodiment, DSP 150 may be configured to estimate the rotation matrix H and track the change in the rotation matrix H over time, e.g., using a suitable blind equalization algorithm.

In another example embodiment, system 100 may be configured to use a predetermined pilot sequence, known a priori to both optical transmitter 110 and optical receiver 130, to enable DSP 150 to estimate the rotation matrix H. This predetermined pilot sequence may be repeatedly transmitted according to the schedule. The time intervals between the pilot-sequence transmissions may be used for the transmission of payload data.

In an example embodiment, the pilot sequence may comprise the following three linearly independent Jones vectors $P_1$-$P_3$:

$$P_1 = (1,0)^t \quad (10a)$$

$$P_2 = (1,1)^t \quad (10b)$$

$$P_3 = (1,j)^t \quad (10c)$$

where the superscript t denotes transposition. In Stokes space, the transmission of the Jones-vector sequence $P_1$, $P_2$, $P_3$ corresponds to the transmission of the Stokes sub-vector sequence $Q_1$, $Q_2$, $Q_3$, where the Stokes sub-vectors $Q_1$-$Q_3$ are given by Eqs (11a)-(11c) as follows:

$$Q_1 = (1,0,0)^t \quad (11a)$$

$$Q_2 = (0,2,0)^t \quad (11b)$$

$$Q_3 = (0,0,2)^t \quad (11c)$$

Note that each of the Stokes sub-vectors $Q_1$-$Q_3$ has three components that, in the notation of Eq. (5), correspond to the Stokes-vector components $S_1$, $S_2$, and $S_3$, respectively.

The transmission of the Stokes sub-vector sequence $Q_1$, $Q_2$, $Q_3$ by optical transmitter 110 causes DSP 150 to receive, on electrical bus 142, the Stokes sub-vector sequence $R_1$, $R_2$, $R_3$, where the Stokes sub-vectors $R_1$-$R_3$ are given by Eqs (12a)-(12c) as follows:

$$R_1 = (R_{11}, R_{21}, R_{31})^t \quad (12a)$$

$$R_2 = (R_{12}, R_{22}, R_{32})^t \quad (12b)$$

$$R_3 = (R_{13}, R_{23}, R_{33})^t \quad (12c)$$

The Stokes sub-vector components $R_{11}$, $R_{12}$, and $R_{13}$ are measured by detector 140 and received by DSP 150 on the $S_1$ line of bus 142. The Stokes sub-vector components $R_{21}$, $R_{22}$, and $R_{23}$ are measured by detector 140 and received by DSP 150 on the $S_2$ line of bus 142. The Stokes sub-vector components $R_{31}$, $R_{32}$, and $R_{33}$ are measured by detector 140 and received by DSP 150 on the $S_3$ line of bus 142. From these measurements, DSP 150 can calculate an estimate of the rotation matrix H using Eq. (13):

$$H = (R_1\ R_2\ R_3)(Q_1\ Q_2\ Q_3)^{-1} \quad (13)$$

where $(R_1\ R_2\ R_3)$ is a 3×3 matrix whose columns are the Stokes sub-vectors $R_1$, $R_2$, and $R_3$; $(Q_1\ Q_2\ Q_3)$ is a 3×3 matrix whose columns are the Stokes sub-vectors $Q_1$, $Q_2$, and $Q_3$; and the power of −1 denotes the matrix inversion. Once the estimate of the rotation matrix H is calculated, the inverted rotation matrix $H^{-1}$ can also be generated, e.g., using methods known in the art. The estimate of the inverted rotation matrix $H^{-1}$ can then be applied at step 204 to the payload-data transmissions received by optical receiver 130 before the next transmission of the pilot sequence in the next instance of step 202.

Based on the above description of step 202, one of ordinary skill in the art will understand how to use other suitable Jones-vector sequences to determine or estimate the rotation matrix H.

At step 204, in each time slot corresponding to a payload data transmission, DSP 150 performs the following transformation of a Stokes sub-vector R to generate a corresponding Stokes sub-vector T:

$$T = H^{-1} R \quad (14)$$

where $H^{-1}$ is the inverted rotation matrix H determined or estimated at step 202, and R is the Stokes sub-vector defined by Eq. (8) and whose component values have been received on bus 142 in the corresponding time slot. One of ordinary skill in the art will understand that the transformation defined by Eq. (14) enables DSP 150 to estimate the Stokes sub-vector corresponding to the Jones vector $E_{h,v}$ actually transmitted by optical transmitter 110 in the corresponding time slot.

At step 206, for each Stokes sub-vector T generated at step 204, DSP 150 determines an estimate of the corresponding Jones vector $E_{h,v}$. In an example embodiment, this determination can be performed using the relationship between the Jones and Stokes vectors already explained above in reference to Eqs. (1) and (5), and the definition of phase $\phi$ given in Eq. (3c). The estimate of the Jones vector $E_{h,v}$ enables DSP 150 to determine or estimate the following parameters: $A_h$, $A_v$, and $\phi$ (see Eq. (9)).

At step 208, DSP 150 uses the values of $A_h$, $A_v$, and $\phi$ determined or estimated at step 206 to determine or estimate the payload data encoded in the received optical signal in the corresponding time slot. More specifically, the value of $A_h$ is used in a conventional manner to determine the level of the amplitude-modulated signal transmitted on the horizontal polarization of optical signal 118. The determined level is then used to determine the corresponding bit word from data stream 102. Similarly, the values of $A_v$ and $\phi$ are used in a conventional manner to determine a constellation symbol carried by the amplitude- and/or phase-modulated signal transmitted on the vertical polarization of optical signal 118. The determined constellation symbol may then be used to determine the corresponding bit word from data stream 102. The two bit words determined in this manner can then be appropriately multiplexed or combined to reconstruct the corresponding data segment of input data stream(s) 102 for being outputted from DSP 150 as indicated in FIG. 1.

FIGS. 3A-3F show block diagrams of various embodiments of optical transmitter 110 (FIG. 1). Each of the embodiments is constructed using a suitable subset of a set of optical elements. The nominally identical optical elements from this set are therefore labeled using the same respective label in each of FIGS. 3A-3F. Data stream 102 can be de-multiplexed, as known in the art, to provide different data sub-streams for modulating the two different polarizations of light that are combined to generate optical PDM signal 118.

Figure 3A:
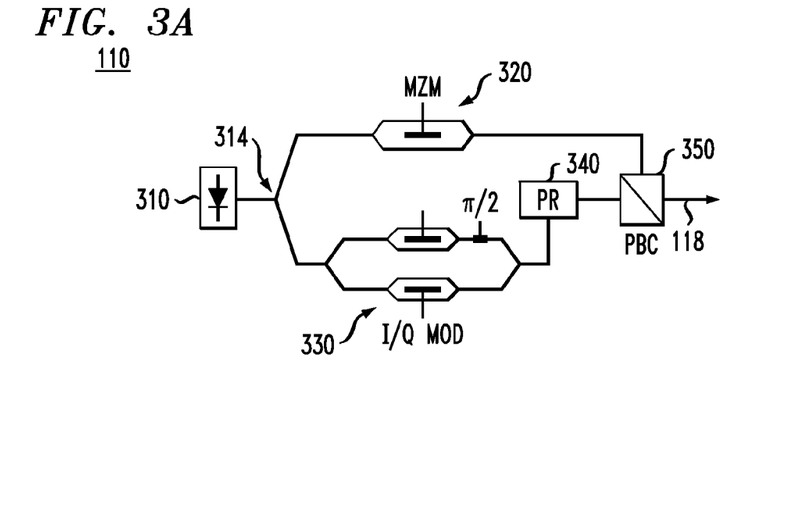
FIGS. 3A-3F show block diagrams of various example embodiments of an optical transmitter that can be used in the optical transport system of FIG. 1.

FIG. 3A shows a block diagram of a first example embodiment of optical transmitter 110. In this embodiment, optical transmitter 110 comprises a laser 310. An optical power splitter 314 operates to intensity split an optical beam generated by laser 310 into two sub-beams, e.g., sub-beams of about equal intensity. The first sub-beam is intensity-modulated in a Mach-Zehnder modulator (MZM) 320 to carry data. The second sub-beam is intensity- and/or phase-modulated in an I/Q modulator 330 to carry data. A polarization rotator (PR) 340 then rotates by about 90 degrees the polarization of the modulated optical beam generated by I/Q modulator 330. A polarization-beam combiner (PBC) 350 then generates optical PDM signal 118 by combining (i) the modulated optical beam generated by MZM 320 and (ii) the modulated optical beam outputted by polarization rotator 340 while conserving their relative polarization rotation of about 90 degrees.

Figure 3B:
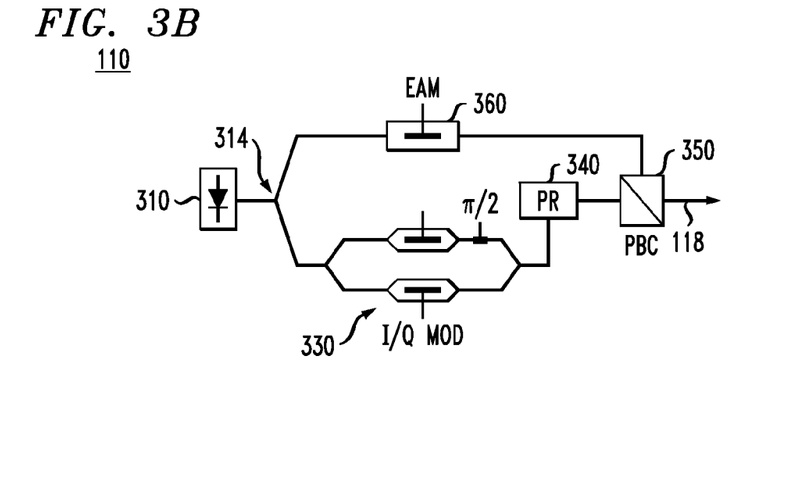

FIG. 3B shows a block diagram of a second example embodiment of optical transmitter 110. In this embodiment, optical transmitter 110 also comprises laser 310, optical power splitter 314, I/Q modulator 330, polarization rotator 340, and polarization-beam combiner (PBC) 350. However, MZM 320 is replaced by an electro-absorption modulator (EAM) 360. Optical power splitter 314 operates to intensity split an optical beam generated by laser 310 into two sub-beams, e.g., sub-beams of about equal intensity. The first sub-beam is intensity-modulated in EAM 360 to carry data. The second sub-beam is intensity- and/or phase-modulated in I/Q modulator 330 to carry data. Polarization rotator 340 rotates by about 90 degrees the polarization of the modulated optical beam generated by I/Q modulator 330. Polarization-beam combiner 350 then generates optical PDM signal 118 by combining (i) the modulated optical beam generated by EAM 360 and (ii) the modulated optical beam outputted by polarization rotator 340 while conserving their relative polarization rotation of about 90 degrees.

Figure 3C:
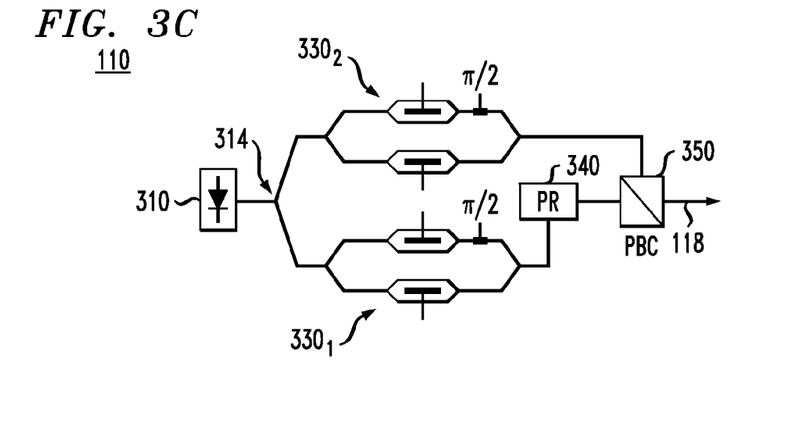

FIG. 3C shows a block diagram of a third example embodiment of optical transmitter 110. This embodiment of optical transmitter 110 is generally similar to the first embodiment shown in FIG. 3A, except that MZM 320 is replaced by a second instance (copy) of I/Q modulator 330. The two copies of I/Q modulator 330 are labeled in FIG. 3C as $330_1$ and $330_2$, respectively. Although I/Q modulator $330_2$ is capable of producing both amplitude and phase modulation, in this particular embodiment, I/Q modulator $330_2$ is configured to produce amplitude modulation only (no phase modulation).

Figure 3D:
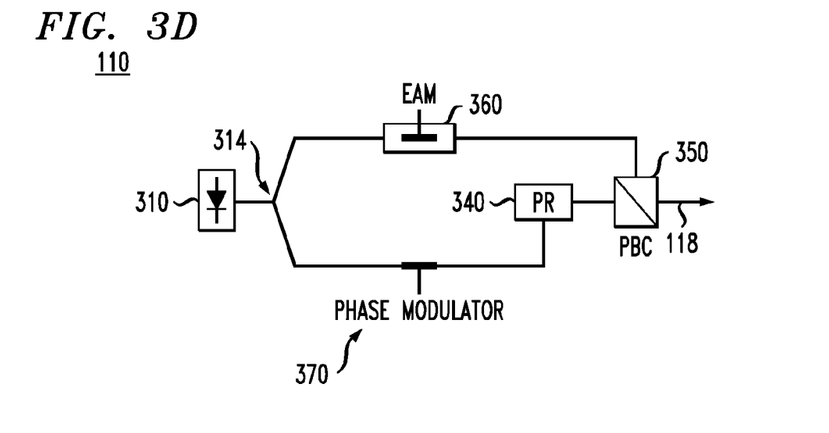

FIG. 3D shows a block diagram of a fourth example embodiment of optical transmitter 110. In this embodiment, optical power splitter 314 operates to intensity split an optical beam generated by laser 310 into two sub-beams. The first sub-beam is intensity-modulated in EAM 360. The second sub-beam is phase-modulated in a phase modulator 370 to carry data. Polarization rotator 340 then rotates by about 90 degrees the polarization of the modulated optical beam generated by phase modulator 370 to carry data. Polarization-beam combiner 350 then generates optical PDM signal 118 by combining (i) the modulated optical beam generated by EAM 360 and (ii) the modulated optical beam outputted by polarization rotator 340 while conserving their relative polarization rotation of about 90 degrees.

Figure 3E:
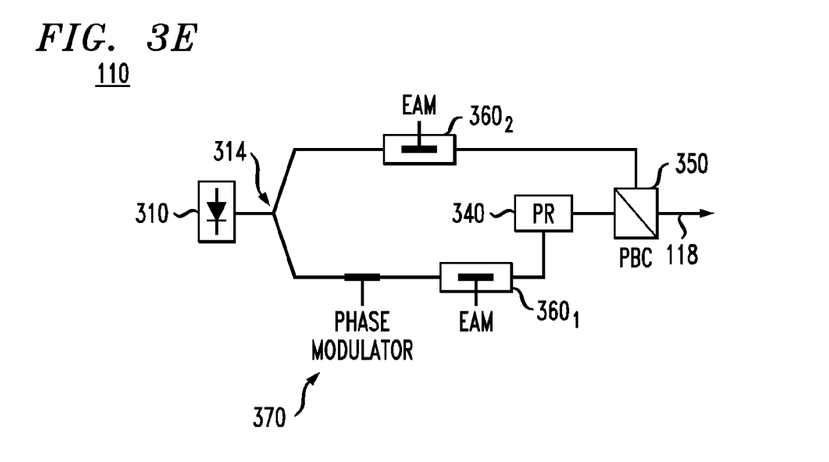

FIG. 3E shows a block diagram of a fifth example embodiment of optical transmitter 110. In this embodiment, optical transmitter 110 comprises two instances of EAM 360, which are labeled in FIG. 3E as $360_1$ and $360_2$, respectively. Optical power splitter 314 operates to split an optical beam generated by laser 310 into two sub-beams. The first sub-beam is intensity-modulated in EAM $360_2$. The second sub-beam is phase-modulated in phase modulator 370 and further amplitude-modulated in EAM $360_1$. Polarization rotator 340 then rotates by 90 degrees the polarization of the modulated optical beam generated by EAM $360_1$. Polarization-beam combiner 350 then generates optical PDM signal 118 by combining (i) the modulated optical beam generated by EAM $360_2$ and (ii) the modulated optical beam outputted by polarization rotator 340.

Figure 3F:
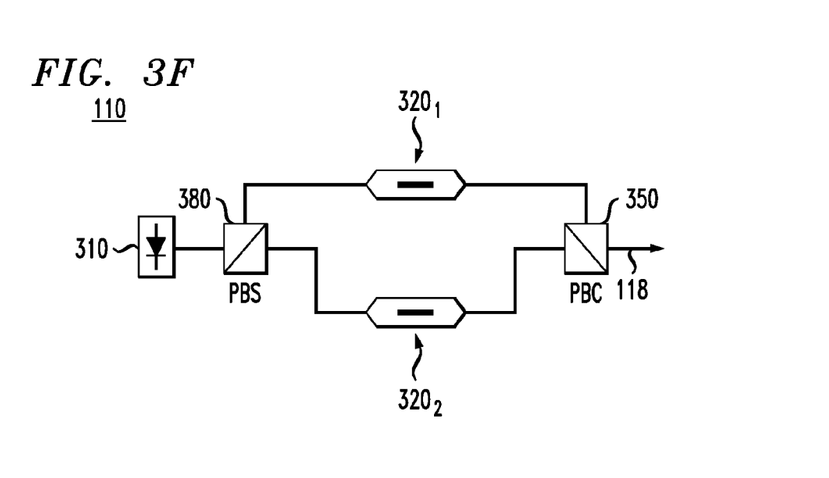

FIG. 3F shows a block diagram of a sixth example embodiment of optical transmitter 110. In this embodiment, optical transmitter 110 comprises two instances of MZM 320, which are labeled in FIG. 3F as $320_1$ and $320_2$, respectively. The functionality of optical power splitter 314 and polarization rotator 340 is implemented using a polarization-beam splitter (PBS) 380. One of ordinary skill in the art will understand that, for optimal operation, the polarization of the output beam generated by laser 310 may be oriented at about 45 degrees with respect to principal polarization axes of polarization-beam splitter 380.

One of ordinary skill in the art will understand how to construct additional embodiments of optical transmitter 110, e.g., using PBS 380 and the various modulator options shown in FIGS. 3A-3E.

Polarization-beam splitter 380 operates to split the output beam generated by laser 310 into two orthogonally polarized sub-beams. The first sub-beam is intensity-modulated in MZM $320_1$ to carry data. The second sub-beam is intensity-modulated in MZM $320_2$ to carry data. Polarization-beam combiner 350 then generates optical PDM signal 118 by combining (i) the modulated optical beam generated by MZM $320_1$ and (ii) the modulated optical beam generated by MZM $320_2$.

Figure 4:
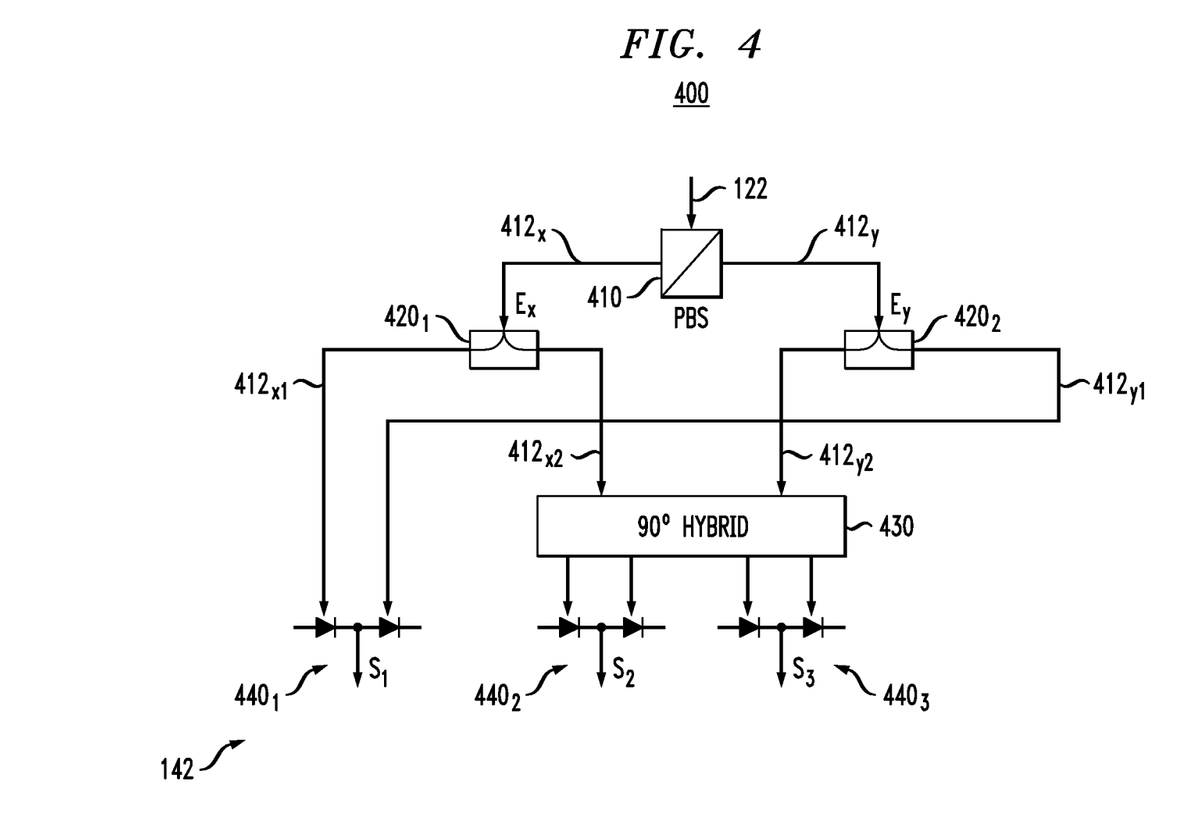
FIG. 4 shows a block diagram of a Stokes-vector detector that can be used, e.g., in an optical receiver of the optical transport system of FIG. 1.

FIG. 4 shows a block diagram of a Stokes-vector detector 400 that can be used as Stokes-vector detector 140 (FIG. 1) according to an embodiment of the disclosure. For illustration purposes, detector 400 is shown in FIG. 4 as being (i) configured to receive optical PDM signal 122 and (ii) connected to electrical bus 142. Based on this disclosure, a person of ordinary skill in the relevant arts will understand that other configurations of detector 400 are also possible.

Detector 400 comprises a polarization-beam splitter 410 configured to split optical PDM signal 122 into two orthogonally polarized sub-beams, labeled $412_x$ and $412_y$, respectively. Optical sub-beam $412_x$ is then applied to an optical power splitter $420_1$ that further splits it into two (attenuated) copies, labeled $412_{x1}$ and $412_{x2}$, respectively, e.g., two about equal intensity beams. Optical sub-beam $412_y$ is similarly applied to an optical power splitter $420_2$ that further splits it into two (attenuated) copies, labeled $412_{y1}$ and $412_{y2}$, respectively, e.g., two about equal intensity beams.

Detector 400 further comprises three balanced pairs $440_1$-$420_3$ of photodetectors, each pair being output-coupled to a respective line of electrical bus 142. Photodetector pair $440_1$ is configured to receive optical sub-beams $412_{x1}$ and $412_{y1}$, as indicated in FIG. 4. Photodetector pairs $440_2$ and $420_3$ are coupled to the four outputs of an optical hybrid 430, as further indicated in FIG. 4. Optical hybrid 430 operates to optically mix, e.g., in a conventional manner, optical sub-beams $412_{x2}$ and $412_{y2}$ to generate the four mixed optical beams that are then applied to photodetector pairs $440_2$ and $420_3$. One of ordinary skill in the art will understand that this structure can cause detector 400 to output on the three lines of bus 142 the measured values of components $S_1$-$S_3$, respectively, of the Stokes sub-vector R defined by Eq. (8).

Example optical hybrids that are suitable for use in detector 400 are described, e.g., in commonly owned U.S. Pat. Nos. 7,809,284 and 8,275,224, both of which are incorporated herein by reference in their entirety.

According to an example embodiment disclosed above in reference to FIGS. 1-4, provided is an apparatus comprising: an optical detector (e.g., 140, FIG. 1) that includes a polarization splitter (e.g., 410, FIG. 4) configured to split an optical polarization-division-multiplexed (PDM) signal (e.g., 122, FIG. 1) into two light beams (e.g., 412x, 412y, FIG. 4) and an optical-to-electrical converter (e.g., 440, FIG. 4) configured to generate first, second, and third electrical signals (e.g., on $S_1$-$S_3$ of 142, FIGS. 1, 4) by optically detecting different combinations of light of the two light beams, the first, second, and third electrical signals being measurements of three nontrivial components (e.g., R, Eq. (8)) of a Stokes vector of the optical PDM signal or linearly independent combinations of said three nontrivial components; and a digital signal processor (e.g., 150, FIG. 1) configured to receive the first, second, and third electrical signals from the optical detector and generate therefrom an estimate of first data carried by a first polarization of the optical PDM signal and second data carried by a different second polarization of the optical PDM signal.

In some embodiments of the above apparatus, the digital signal processor is configured to generate, based on the first, second, and third electrical signals, an estimate of third data carried by the optical PDM signal, said third data being encoded in a relative phase between the first polarization and the different second polarization of the optical PDM signal.

In some embodiments of any of the above apparatus, the optical-to-electrical converter is configured to generate the first, second, and third electrical signals without optically mixing the light of any of the two light beams with light of an optical local oscillator.

In some embodiments of any of the above apparatus, the digital signal processor is configured to rotate said three nontrivial components of the Stokes vector via a rotation matrix (e.g., H, Eq. (13)) to at least partially compensate polarization-state rotation of the optical PDM signal during optical transmission to the optical detector.

In some embodiments of any of the above apparatus, the digital signal processor is configured to generate the rotation matrix by applying blind equalization to the first, second, and third electrical signals.

In some embodiments of any of the above apparatus, the digital signal processor is configured to generate the rotation matrix based on measurements of another optical PDM signal configured to carry a predetermined pilot sequence (e.g., $P_1$, $P_2$, $P_3$, Eq. (10)).

In some embodiments of any of the above apparatus, the apparatus further comprises an optical transmitter (e.g., 110, FIG. 1) configured to cause the optical detector to receive the optical PDM signal via an optical fiber channel (e.g., 120, FIG. 1).

In some embodiments of any of the above apparatus, the optical transmitter is configured to: amplitude modulate the first data onto one polarization of an optical carrier without phase-modulating the first data onto said one polarization of the optical carrier; and modulate the second data onto another different polarization of the optical carrier using phase modulation.

In some embodiments of any of the above apparatus, the optical transmitter is further configured to modulate the second data onto said another different polarization of the optical carrier using amplitude modulation.

In some embodiments of any of the above apparatus, the first polarization is amplitude-modulated with the first data; and the second polarization is phase-modulated with the second data.

In some embodiments of any of the above apparatus, the second polarization is further amplitude-modulated with the second data.

In some embodiments of any of the above apparatus, the optical-to-electrical converter is further configured to generate a fourth electrical signal (e.g., on $S_0$ of 142, FIG. 1) by optically detecting an additional different combination of the light of the two light beams, the fourth electrical signal being a measurement of a fourth component of the Stokes vector of the optical PDM signal, said fourth component being different from any of the three nontrivial components of the Stokes vector.

In some embodiments of any of the above apparatus, the digital signal processor is further configured to receive the fourth electrical signal from the optical detector and generate the estimate of the first data and the second data using the fourth electrical signal.

In some embodiments of any of the above apparatus, the digital signal processor is further configured to: generate an estimate of a Jones vector (e.g., $E_{h,v}$, Eq. (9)) corresponding to the Stokes vector; and generate the estimate of the first data and the second data using the Jones vector.

According to another example embodiment disclosed above in reference to FIGS. 1-4, provided is an apparatus comprising an optical-to-electrical (O/E) converter (e.g., 140, FIG. 1) configured to convert a first optical polarization-division-multiplexed (PDM) signal (e.g., 122, FIG. 1) into first, second, and third electrical signals (e.g., on $S_1$-$S_3$ of 142, FIG. 1), wherein: a first polarization of the first optical PDM signal is modulated with first data; a second polarization of the first optical PDM signal is modulated with second data different from the first data; and each of the first, second, and third electrical signals represents a respective component (e.g., one of components $S_1$-$S_3$) of a first Stokes sub-vector (e.g., R, Eq. (8)) corresponding to a polarization state of the first optical PDM signal at the photodetector. The apparatus further comprises a signal processor (e.g., 150, FIG. 1) configured to process the first, second, and third electrical signals to recover the first data and the second data.

In some embodiments of the above apparatus, the O/E converter is not configured to use an optical local-oscillator signal in a process of converting the first PDM signal into the first, second, and third electrical signals.

In some embodiments of any of the above apparatus, the O/E converter is further configured to convert the first PDM signal into a fourth electrical signal (e.g., on $S_0$ of 142, FIG. 1); and the signal processor is further configured to process the fourth electrical signal to recover the first data and the second data.

In some embodiments of any of the above apparatus, the first polarization of the optical PDM signal is amplitude-modulated with the first data; the second polarization of the optical PDM signal is amplitude-modulated with the second data; a relative phase between the first polarization and the second polarization is modulated with third data different from the first data and the second data; and the signal processor is further configured to process the first, second, and third electrical signals to recover the third data.

In some embodiments of any of the above apparatus, the signal processor is configured to: transform the first Stokes sub-vector into a second Stokes sub-vector (e.g., T, Eq. (14)) using a rotation matrix (e.g., H, Eq. (13)) that represents polarization-state rotation in an optical transport link (e.g., 120, FIG. 1) configured to apply the first PDM signal to the O/E converter; and recover the first data and the second data using the second Stokes sub-vector.

In some embodiments of any of the above apparatus, the signal processor is configured to generate the rotation matrix by applying blind equalization to the first, second, and third electrical signals.

In some embodiments of any of the above apparatus, the signal processor is configured to generate the rotation matrix based on a second optical PDM signal applied by the optical transport link to the O/E converter prior to the first optical PDM signal, said second optical PDM signal configured to carry a predetermined pilot sequence (e.g., $P_1$, $P_2$, $P_3$, Eq. (10)).

In some embodiments of any of the above apparatus, the predetermined pilot sequence has a duration of at least three time slots, each allotted to a respective set of constellation symbols consisting of a respective first constellation symbol transmitted on the first polarization and a respective second constellation symbol transmitted on the second polarization.

In some embodiments of any of the above apparatus, the respective first constellation symbol belongs to a first constellation (e.g., N-PAM); and the respective second constellation symbol belongs to a second constellation (e.g., M-QAM) different from the first constellation.

In some embodiments of any of the above apparatus, the signal processor is configured to: determine a Jones vector (e.g., $E_{h,v}$, Eq. (9)) corresponding to the second Stokes sub-vector; and recover the first data and the second data using the Jones vector.

In some embodiments of any of the above apparatus, the apparatus further comprises the optical transport link. In some embodiments of any of the above apparatus, the apparatus further comprises an optical transmitter (e.g., 110, FIG. 1) configured to cause the optical transport link to apply the first PDM signal to the O/E converter.

In some embodiments of any of the above apparatus, the optical transmitter is configured to: modulate the first polarization with the first data using amplitude modulation (e.g., $A_h$ in Eq. (9)), but no phase modulation; and modulate the second polarization with the second data using phase modulation (e.g., $\phi$ in Eq. (9)).

In some embodiments of any of the above apparatus, the optical transmitter is further configured to modulate the second polarization with the second data using amplitude modulation (e.g., $A_v$ in Eq. (9)).

In some embodiments of any of the above apparatus, the first polarization is modulated with the first data using amplitude modulation (e.g., $A_h$ in Eq. (9)), but no phase modulation; and the second polarization is modulated with the second data using phase modulation (e.g., $\phi$ in Eq. (9)).

In some embodiments of any of the above apparatus, the second polarization is further modulated with the second data using amplitude modulation (e.g., $A_v$ in Eq. (9)).

According to yet another example embodiment disclosed above in reference to FIGS. 1-4, provided is an apparatus comprising: an optical splitter (e.g., 314, FIGS. 3A-3E; 380, FIG. 3F) configured to split an optical beam generated by a laser (e.g., 310, FIG. 3) into a first sub-beam and a second sub-beam; a first optical modulator (e.g., 320, FIG. 3A; 360, FIG. 3B) configured to modulate the first sub-beam with first data using amplitude modulation, but no phase modulation; and a second optical modulator (e.g., 330, FIG. 3A; 370, FIGS. 3D, 3E) configured to modulate the second sub-beam with second data using phase modulation, wherein the second data are different from the first data. The apparatus is configured to generate an optical polarization-division-multiplexed (PDM) signal by combining the first sub-beam modulated with the first data and the second sub-beam modulated with the second data in a manner that causes a first (e.g., horizontal) polarization of the optical PDM signal to carry the first data and a second (e.g., vertical) polarization of the optical PDM signal to carry the second data.

In some embodiments of the above apparatus, the apparatus further comprises the laser.

In some embodiments of any of the above apparatus, the second optical modulator is further configured to modulate the second sub-beam with the second data using amplitude modulation.

In some embodiments of any of the above apparatus, the second modulator comprises an electro-absorption modulator (e.g., $360_1$, FIG. 3E).

In some embodiments of any of the above apparatus, the first modulator comprises a Mach-Zehnder modulator (e.g., 320, FIG. 3A).

In some embodiments of any of the above apparatus, the first modulator comprises an electro-absorption modulator (e.g., 360, FIG. 3B).

In some embodiments of any of the above apparatus, the second modulator comprises an I/Q modulator (e.g., 330, FIG. 3A).

According to yet another example embodiment disclosed above in reference to FIGS. 1-4, provided is an apparatus comprising an optical-to-electrical (O/E) converter (e.g., 140, FIG. 1) configured to convert an optical polarization-division-multiplexed (PDM) signal into first, second, and third electrical signals. A first polarization of the optical PDM signal is amplitude-modulated with first data. A second polarization of the optical PDM signal is amplitude-modulated with second data different from the first data. A relative phase between the first polarization and the second polarization is modulated with third data different from the first and second data. Each of the first, second, and third electrical signals represents a respective component of a Stokes sub-vector corresponding to a polarization state of the optical PDM signal at the photodetector. The apparatus further comprises a signal processor (e.g., 150, FIG. 1) configured to process the first, second, and third electrical signals to recover the first data, the second data, and the third data.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
an optical detector that includes a polarization splitter configured to split an optical polarization-division-multiplexed (PDM) signal into two light beams and an optical-to-electrical converter configured to generate first, second, and third electrical signals by optically detecting different combinations of light of the two light beams, the first, second, and third electrical signals being measurements of three nontrivial components of a Stokes vector of the optical PDM signal or linearly independent combinations of said three nontrivial components; and
a digital signal processor configured to receive the first, second, and third electrical signals from the optical detector and generate therefrom an estimate of first data carried by a first polarization of the optical PDM signal and second data carried by a different second polarization of the optical PDM signal.

2. The apparatus of claim 1, wherein the digital signal processor is configured to generate, based on the first, second, and third electrical signals, an estimate of third data carried by the optical PDM signal, said third data being encoded in a relative phase between the first polarization and the different second polarization of the optical PDM signal.

3. The apparatus of claim 1, wherein the optical-to-electrical converter is configured to generate the first, second, and third electrical signals without optically mixing the light of any of the two light beams with light of an optical local oscillator.

4. The apparatus of claim 1, wherein the digital signal processor is configured to rotate said three nontrivial components of the Stokes vector via a rotation matrix to at least partially compensate polarization-state rotation of the optical PDM signal during optical transmission to the optical detector.

5. The apparatus of claim 4, wherein the digital signal processor is configured to generate the rotation matrix by applying blind equalization to the first, second, and third electrical signals.

6. The apparatus of claim 4, wherein the digital signal processor is configured to generate the rotation matrix based on measurements of another optical PDM signal configured to carry a predetermined pilot sequence.

7. The apparatus of claim 4, further comprising an optical transmitter configured to cause the optical detector to receive the optical PDM signal via an optical fiber channel.

8. The apparatus of claim 7, wherein the optical transmitter is configured to:
amplitude modulate the first data onto one polarization of an optical carrier without phase-modulating the first data onto said one polarization of the optical carrier; and
modulate the second data onto another different polarization of the optical carrier using phase modulation.

9. The apparatus of claim 8, wherein the optical transmitter is further configured to modulate the second data onto said another different polarization of the optical carrier using amplitude modulation.

10. The apparatus of claim 1, wherein:
the first polarization is amplitude-modulated with the first data; and
the second polarization is phase-modulated with the second data.

11. The apparatus of claim 10, wherein the second polarization is further amplitude-modulated with the second data.

12. The apparatus of claim 1, wherein the optical-to-electrical converter is further configured to generate a fourth electrical signal by optically detecting an additional different combination of the light of the two light beams, the fourth electrical signal being a measurement of a fourth component of the Stokes vector of the optical PDM signal, said fourth component being different from any of the three nontrivial components of the Stokes vector.

13. The apparatus of claim 12, wherein the digital signal processor is further configured to receive the fourth electrical signal from the optical detector and generate the estimate of the first data and the second data using the fourth electrical signal.

14. The apparatus of claim 1, wherein the digital signal processor is further configured to:
   generate an estimate of a Jones vector corresponding to the Stokes vector; and
   generate the estimate of the first data and the second data using the Jones vector.

* * * * *